(12) United States Patent
Yokota et al.

(10) Patent No.: US 11,254,271 B2
(45) Date of Patent: Feb. 22, 2022

(54) SHOCK-ABSORBING MEMBER

(71) Applicants: UACJ CORPORATION, Tokyo (JP); HONDA MOTOR CO., LTD., Tokyo (JP)

(72) Inventors: Tomoya Yokota, Tokyo (JP); Tatsuo Inagaki, Tokyo (JP); Keiichiro Tsuji, Saitama (JP); Ryo Kita, Saitama (JP); Tomohide Sekiguchi, Saitama (JP); Naoki Takaki, Saitama (JP)

(73) Assignees: UACJ CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/058,263

(22) PCT Filed: May 31, 2019

(86) PCT No.: PCT/JP2019/021708
§ 371 (c)(1),
(2) Date: Nov. 24, 2020

(87) PCT Pub. No.: WO2019/230947
PCT Pub. Date: Dec. 5, 2019

(65) Prior Publication Data
US 2021/0197746 A1 Jul. 1, 2021

(30) Foreign Application Priority Data
May 31, 2018 (JP) .............................. JP2018-105078

(51) Int. Cl.
*B60J 7/00* (2006.01)
*B60R 19/18* (2006.01)
(Continued)

(52) U.S. Cl.
CPC .............. *B60R 19/18* (2013.01); *B60R 19/04* (2013.01); *B23K 33/00* (2013.01);
(Continued)

(58) Field of Classification Search
CPC ............ B05D 2451/00; B05D 2401/10; B05D 2401/32; B65D 2583/0409;
(Continued)

(56) References Cited

U.S. PATENT DOCUMENTS 2,916,600 A * 12/1959 Tichler ................. B23K 33/004
219/74
3,510,624 A * 5/1970 Bennett .................. B23K 33/00
219/91.23
(Continued)

FOREIGN PATENT DOCUMENTS

| JP | 2003054445 A | 2/2003 |
| JP | 2004203202 A | 7/2004 |

(Continued)

OTHER PUBLICATIONS

Office action issued in JP 2018-105078, dated Jul. 16, 2019 (with machine translation).

(Continued)

*Primary Examiner* — Kiran B Patel
(74) *Attorney, Agent, or Firm* — Greer Burns & Crain Ltd.

(57) ABSTRACT

A shock absorbing member of the present disclosure is a shock absorbing member including a first hollow member (11) and a second hollow member (12) that are made of aluminum alloy and are weld joined to each other, in which a weld material and weld beads (W) do not project from a side on which a joined surface between the first hollow member (11) and the second hollow member (12) is located.

6 Claims, 4 Drawing Sheets

(51) Int. Cl.
*B60R 19/04* (2006.01)
*B23K 103/10* (2006.01)
*B23K 101/04* (2006.01)
*B23K 33/00* (2006.01)
*F16F 7/00* (2006.01)

(52) U.S. Cl.
CPC .... *B23K 2101/045* (2018.08); *B23K 2103/10* (2018.08); *B60R 2019/182* (2013.01); *F16F 7/00* (2013.01)

(58) Field of Classification Search
CPC .... B65D 2583/0431; B60G 2204/4502; B60G 2202/312; B60G 2204/128; B60G 2204/418; B60R 19/18
See application file for complete search history.

(56) References Cited

U.S. PATENT DOCUMENTS

| | | | | |
|---|---|---|---|---|
| 4,292,496 | A * | 9/1981 | Hoy | B23K 33/004 219/126 |
| 4,412,122 | A * | 10/1983 | Bohm | B23K 33/008 219/137 R |
| 4,481,402 | A * | 11/1984 | Hoy | B23K 33/00 219/126 |
| 5,813,592 | A * | 9/1998 | Midling | B23K 20/122 228/112.1 |
| 5,979,742 | A * | 11/1999 | Enomoto | B23K 20/122 228/112.1 |
| 6,193,137 | B1 * | 2/2001 | Ezumi | B23K 20/122 228/112.1 |
| 6,290,117 | B1 * | 9/2001 | Kawasaki | B23K 20/122 228/112.1 |
| 6,337,147 | B1 * | 1/2002 | Haszler | B23K 9/23 428/654 |
| 6,532,712 | B2 * | 3/2003 | Kawasaki | B23K 20/122 52/693 |
| 6,561,571 | B1 * | 5/2003 | Brennecke | B62D 29/002 264/277 |
| 6,581,819 | B1 * | 6/2003 | Aota | B23K 33/00 228/112.1 |
| 6,622,904 | B2 * | 9/2003 | Ezumi | B23K 20/122 228/112.1 |
| 9,623,509 | B2 * | 4/2017 | Lalam | B23K 9/23 |
| 9,833,861 | B2 * | 12/2017 | Taniguchi | B23K 20/227 |
| 9,863,103 | B2 * | 1/2018 | Osberg | E01D 19/12 |
| 10,350,694 | B2 * | 7/2019 | Wang | B23K 9/0026 |
| 10,478,919 | B2 * | 11/2019 | Aoki | B23K 26/242 |
| 10,501,827 | B2 * | 12/2019 | Champagne, Jr. | B23K 28/02 |
| 2003/0005852 | A1 * | 1/2003 | Okamura | B23K 33/00 105/396 |
| 2004/0067373 | A1 | 4/2004 | Kennedy | |
| 2006/0169748 | A1 * | 8/2006 | Ezumi | B23K 20/1215 228/112.1 |
| 2008/0211218 | A1 * | 9/2008 | Booher | B62D 21/20 280/789 |
| 2008/0308610 | A1 * | 12/2008 | Watson | B23K 33/004 228/112.1 |
| 2010/0068550 | A1 * | 3/2010 | Watson | B23K 33/004 428/586 |
| 2010/0089976 | A1 * | 4/2010 | Szymanski | B23K 20/122 228/113 |
| 2010/0089977 | A1 * | 4/2010 | Chen | B23K 20/122 228/114.5 |
| 2011/0206943 | A1 * | 8/2011 | Willis | B23K 33/004 428/609 |
| 2014/0119814 | A1 * | 5/2014 | Osikowicz | B23K 20/1225 403/270 |
| 2014/0248470 | A1 * | 9/2014 | Blomqvist | B29C 66/1122 428/188 |
| 2015/0114746 | A1 | 4/2015 | Nickel et al. | |
| 2016/0016610 | A1 | 1/2016 | Okada et al. | |
| 2016/0114428 | A1 * | 4/2016 | Wang | B23K 26/211 427/554 |
| 2016/0243637 | A1 * | 8/2016 | Kern | B23K 9/173 |
| 2017/0167090 | A1 * | 6/2017 | Allen | E01D 19/125 |
| 2017/0197269 | A1 * | 7/2017 | Matsumoto | B23K 3/063 |
| 2017/0304928 | A1 * | 10/2017 | Sigler | B23K 11/20 |
| 2018/0023286 | A1 * | 1/2018 | Allen | B23K 20/127 52/588.1 |
| 2018/0056437 | A1 * | 3/2018 | Bray | B23K 20/12 |
| 2018/0111226 | A1 * | 4/2018 | Wang | B23K 26/26 |
| 2018/0243861 | A1 * | 8/2018 | Wang | B23K 26/322 |
| 2019/0111523 | A1 * | 4/2019 | Pham | B23K 31/02 |
| 2019/0126398 | A1 * | 5/2019 | Yang | B23K 26/32 |
| 2019/0126402 | A1 * | 5/2019 | Yang | B23K 26/0006 |
| 2019/0224781 | A1 * | 7/2019 | Yang | B23K 26/322 |
| 2020/0078883 | A1 * | 3/2020 | Seo | B23K 20/122 |
| 2020/0114469 | A1 * | 4/2020 | Tao | B23K 26/32 |
| 2020/0130618 | A1 * | 4/2020 | Hasegawa | B60R 19/24 |
| 2020/0164461 | A1 * | 5/2020 | Hiro | B23K 20/1265 |
| 2021/0069823 | A1 * | 3/2021 | Wang | B23K 20/1265 |

FOREIGN PATENT DOCUMENTS

| | | |
|---|---|---|
| JP | 2004262300 A | 9/2004 |
| JP | 2004528196 A | 9/2004 |
| JP | 2005152920 A | 6/2005 |
| JP | 2006232198 A | 9/2006 |
| JP | 5140093 B2 | 2/2013 |
| WO | 2014163203 A1 | 10/2014 |

OTHER PUBLICATIONS

ISR issued in Int'l. Application No. PCT/JP2019/021708, mailed Jul. 23, 2019 (with translation).

* cited by examiner

SHOCK-ABSORBING MEMBER

This is a National Phase Application filed under 35 U.S.C. § 371, of International Application No. PCT/JP2019/021708, filed May 31, 2019, the contents of which are incorporated by reference.

TECHNICAL FIELD

The present disclosure relates to a shock absorbing member.

BACKGROUND ART

Regarding vehicles, such as automobiles, various methods for reducing injury to drivers have been considered in order to protect the drivers at the time of crash. In particular, bumpers are mounted on the front and rear of a vehicle and are supposed to crash against an oncoming vehicle or crash against a wall or the like because of driving error. As such, importance of bumpers as shock absorbing members has increased.

An automobile basically has bumper structures for absorbing shock at the time of crash mounted on the front and rear of the automobile. A bumper structure generally includes a bumper reinforcement and an energy absorbing member. The bumper reinforcement receiving shock and the energy absorbing member deforming enables the bumper structure to suppress damage to a vehicle body. Regarding, in particular, a bumper mounted on the front of a vehicle, various crash conditions can be considered. The crash conditions include, for example, offset crash and full-wrap crash. Contact with a pedestrian is also one of the crash conditions. While safety is regarded as an important problem, coping with weight reduction of a whole vehicle to solve environmental problems is also an important problem, and a bumper constituting a vehicle is no exception to this problem.

While the circumstances described above has necessitated a shock absorbing member using aluminum alloy, which is lightweight, it has become necessary to investigate strength and shock absorbency of a shock absorbing member suited to crash conditions.

For example, in Patent Literature 1, a bumper structure in which vertically offset crash protection components are arranged is proposed. The bumper structure includes a bumper reinforcement that is formed of a hollow extruded material made of aluminum alloy and a raised member that is formed of a hollow extruded material made of aluminum alloy and that is attached on the upper surface or the under surface of the bumper reinforcement.

CITATION LIST

Patent Literature

Patent Literature 1: Japanese Patent No. 5140093

SUMMARY OF INVENTION

Technical Problem

The bumper structure described in Patent Literature 1 is formed of a hollow extruded material made of aluminum alloy. As such, objectives including reduction in weight of a bumper and reduction in weight of a whole vehicle body associated therewith can be achieved. However, there has been a problem in that, since bumper structures having high strength and high shock absorbency and bumper structures having low strength and low shock absorbency coexist, it is not possible to achieve, with high yield, bumpers that have strength and shock absorbency in accordance with a specification.

An objective of the present disclosure is to provide a shock absorbing member that is usable as a bumper or the like of a vehicle, that excels in strength and shock absorbency, that enables these features to be achieved with high yield, the weight of which is reduced, and that is configured with consideration given to environmental problems.

Solution to Problem

In order to achieve the above-described objective, the present disclosure relates to a shock absorbing member including a first hollow member and a second hollow member that are made of aluminum alloy and weld joined to each other, in which a weld material and weld beads do not project from the side on which a joined surface between the first hollow member and the second hollow member is located.

The inventors have made earnest examination to achieve the above-described objective. As a result, the inventors have found that precision of welding in Patent Literature 1 substantially influences strength and shock absorbency of a shock absorbing member. More specifically, the precision of welding means precision of welding at a boundary surface between the upper surface of the bumper reinforcement and a projecting portion of the raised member when the bumper reinforcement and the raised member are attached to each other.

In Patent Literature 1, a side surface of the bumper reinforcement and a side surface of the raised member including the projecting portion thereof constitute a joined surface when weld joining is performed. When, in the weld-joining, the amount of weld material is excessive or output of the welding is excessively large, weld material or weld beads come to project outward beyond the above-described joined surface. Then, when shock is applied to, for example, the joined surface of the shock absorbing member, energy due to the shock comes to concentrate on the projection. Since the shock absorbing member thus becomes unable to receive energy due to the shock in a dispersing manner with the whole shock absorbing member, the strength and shock absorbency of the shock absorbing member deteriorate.

However, according to the present disclosure, weld material and weld beads produced in weld-joining are configured not to project outward beyond a joined surface defined by the weld-joining. Therefore, even when a shock is applied to the shock absorbing member, energy due to the shock becomes dispersed throughout the shock absorbing member without concentrating on the projections. Thus, it is possible to maintain the strength and shock absorbency of the shock absorbing member at a high level.

In addition, since the shock absorbing member is formed of a hollow member made of aluminum alloy, it is possible to provide the shock absorbing member the weight of which is reduced and thereby cope with environmental problems.

Note that the joined surface in the present disclosure means a surface on which weld material is actually provided and welding is performed and does not mean surfaces that come into contact with each other because of welding.

In an example of the present disclosure, it is possible to form a step on the joined surface and perform weld joining in the step. When a step is formed on the joined surface in this manner, weld material stays in the step and weld beads become formed in the step. Therefore, it is possible to easily prevent weld material and weld beads from projecting outward beyond the joined surface.

In an example of the present disclosure, a second hollow member can be configured to have a triangular cross-section and a first hollow member and the second hollow member can be configured to have surfaces flush with each other on a crash surface side. That is, since the cross-sectional shape of the second hollow member is formed into a triangular shape, it is possible to reduce the weight of the second hollow member by, for example, approximately 10%. The first hollow member and the second hollow member are configured to have surfaces flush with each other on the crash surface side. This configuration enables shock from the outside to be received by both the first hollow member and the second hollow member efficiently, and effective energy dispersion enables high strength and high shock absorbency to be achieved.

Further, in an example of the present disclosure, at least one of the first hollow member or the second hollow member can be formed of an extruded material. This configuration enables at least one of the first hollow member or the second hollow member to be integrally formed to have a desired cross-section and to have no joint portion. Therefore, it is possible to achieve the first hollow member and the like of desired strength.

In an example of the present disclosure, the first hollow member and the second hollow member can be configured as a bumper reinforcement and a raised member, respectively. This configuration enables a bumper structure including a shock absorbing member having the above-described features to be achieved.

Advantageous Effects of Invention

As described in the foregoing, the present disclosure enables a shock absorbing member that is usable as a bumper or the like of a vehicle, that excels in strength and shock absorbency, that enables these features to be achieved with high yield, the weight of which is reduced, and that is configured with consideration given to environmental problems to be provided.

DESCRIPTION OF EMBODIMENTS

Hereinafter, specific features of the present disclosure will be described based on an embodiment of the present disclosure.

Figure 1:
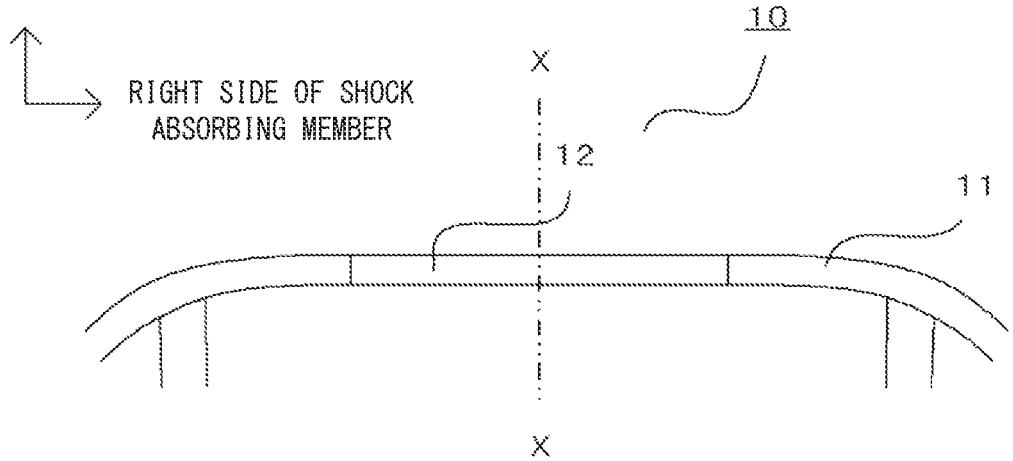
FIG. 1 is a top view of a shock absorbing member in an embodiment of the present disclosure.
Figure 2:
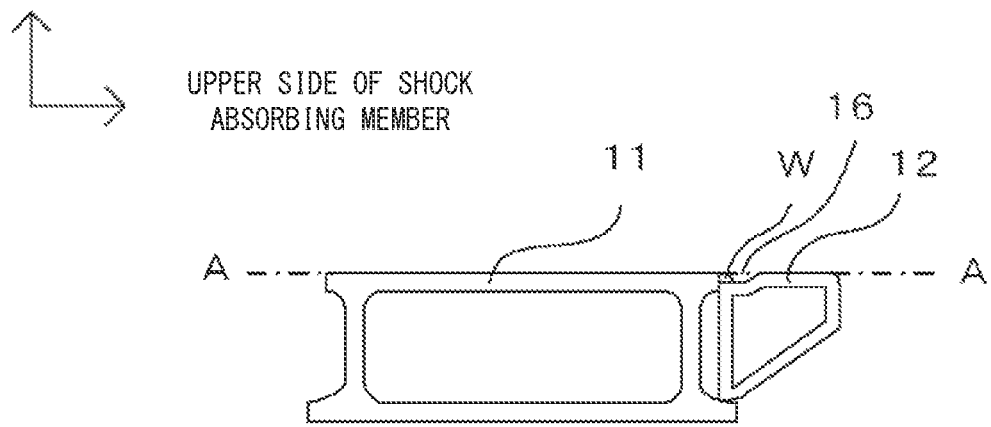
FIG. 2 is a cross-sectional view of the shock absorbing member taken along the line X-X in FIG. 1.

FIG. 1 is a top view of a shock absorbing member of the present disclosure, and FIG. 2 is a cross-sectional view of the shock absorbing member illustrated in FIG. 1.

As illustrated in FIGS. 1 and 2, a shock absorbing member 10 of the present disclosure includes a first hollow member 11 and a second hollow member 12, both of which are made of aluminum alloy. In the present embodiment, as illustrated in FIG. 2, a surface of an edge of the upper surface of the first hollow member 11 and a surface of an edge of the under surface of the second hollow member 12 are joined to each other by welding. Therefore, a welding surface in this case is a surface defined by the surfaces of the edges and specifically means a joined surface indicated by the line A-A in FIG. 2.

In the present embodiment, a step 16 is formed on the joined surface indicated by the line A-A. By welding between an edge of the upper surface of the first hollow member 11 and an edge of the under surface of the second hollow member 12 being performed in the step 16, the first hollow member 11 and the second hollow member 12 are weld-joined.

Note that, in the drawing, a sign W represents at least one of weld material or weld beads.

As described above, in the present embodiment, the step 16 is formed on the joined surface A-A between the first hollow member 11 and the second hollow member 12, and welding is performed in the step 16. Thus, the weld material and weld beads W never project forward of the shock absorbing member beyond the joined surface A-A. Therefore, even when a shock is applied to the shock absorbing member 10 from, for example, the front thereof, energy due to the shock becomes dispersed throughout the shock absorbing member 10 without concentrating on the weld material and weld beads W. As a result, it is possible to maintain strength and shock absorbency of the shock absorbing member 10 at a high level.

The first hollow member 11 and the second hollow member 12 are made of aluminum alloy. Thus, it is possible to provide the shock absorbing member 10 the weight of which is reduced and thereby cope with environmental problems.

As an aluminum alloy constituting the first hollow member 11 and the second hollow member 12, a general-purpose aluminum alloy, such as aluminum 1000 series alloy, aluminum 2000 series alloy, aluminum 3000 series alloy, aluminum 4000 series alloy, aluminum 5000 series alloy, aluminum 6000 series alloy, and aluminum 7000 series alloy, can be used.

As a welding method for joining the first hollow member 11 and the second hollow member 12 to each other, a general-purpose method, such as arc welding, gas welding, electron beam welding, laser welding, MIG welding, and TIG welding, can be used.

Further, in place of performing welding in the step 16, for example, a groove may be formed and welding may be performed in the groove in such a way that the weld material and weld beads W do not project forward beyond the joined surface A-A. Furthermore, in place of forming a step or a groove, the amount of weld material or strength of welding may be adjusted in such a way that the weld material and weld beads W do not project beyond the joined surface A-A.

In the present embodiment, a cross-section of the second hollow member 12 is formed into a triangular shape, as is evident from FIG. 2. On the joined surface A-A side, in other words, on the front side of the shock absorbing member 10, that is, the crash surface side, in this case, the first hollow member 11 and the second hollow member 12 are configured to have surfaces flush with each other (surfaces including the joined surface A-A).

Since the cross-sectional shape of the second hollow member 12 is formed into a triangular shape as described above, it is possible to reduce the weight of the second hollow member 12 by, for example, approximately 10%. Since the first hollow member 11 and the second hollow member 12 are configured to have surfaces flush with each other on the crash surface side, it is possible to make both the first hollow member 11 and the second hollow member 12 receive shock from the outside efficiently. Therefore, effective energy dispersion enables high strength and high shock absorbency to be achieved.

At least either and preferably both of the first hollow member 11 and the second hollow member 12 are formed of an extruded material. Because of this configuration, each of the first hollow member 11 and the second hollow member 12 can be integrally formed in such a way as to have a desired cross-section, thereby having no joint portion. Therefore, it is possible to achieve the first hollow member 11 and second hollow member 12 of desired strength.

In the present embodiment, when the first hollow member 11 and the second hollow member 12 are configured as a bumper reinforcement and a raised member, respectively, it is possible to construct the shock absorbing member 10 as a bumper structure. Therefore, it is possible to provide a bumper structure that has high strength and high shock absorbency and the weight of which is reduced and thus also possible to cope with environmental problems. However, the shock absorbing member 10 of the present embodiment is not limited to a bumper structure and can be used for any other member, such as a mechanical member and a jig, that is required to absorb shock.

EXAMPLES

Although representative Examples of the present disclosure will be described below to clarify the present disclosure more specifically, it is needless to say that the present disclosure is not limited by the description of such Examples. It should be understood that, in addition to not only the following Example but also the specific description described above, various changes, modifications, improvements, and the like can be added to the present disclosure, based on knowledge of those skilled in the art without departing from the spirit of the present disclosure.

Figure 3:
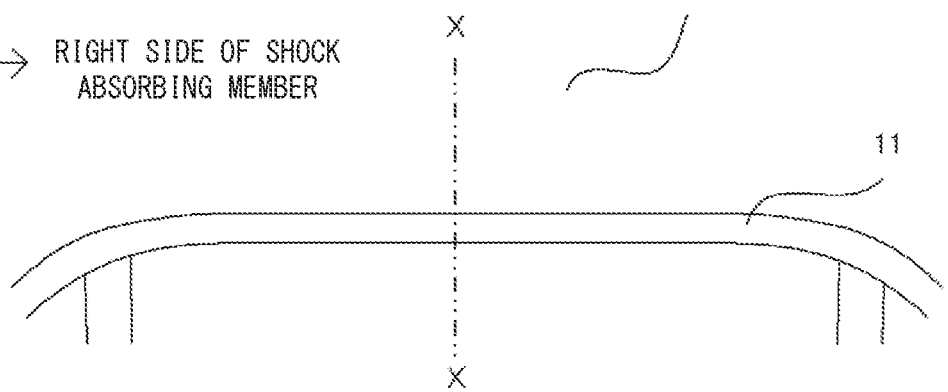
FIG. 3 is a top view of a bumper structure in a Comparative Example.
Figure 4:
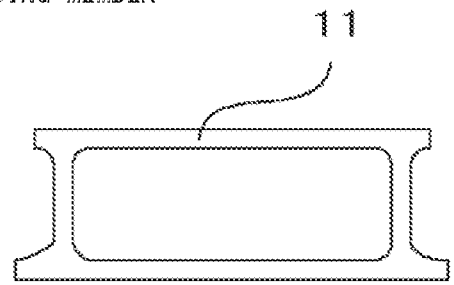
FIG. 4 is a cross-sectional view of the bumper structure taken along the line X-X in FIG. 3.
Figure 5:
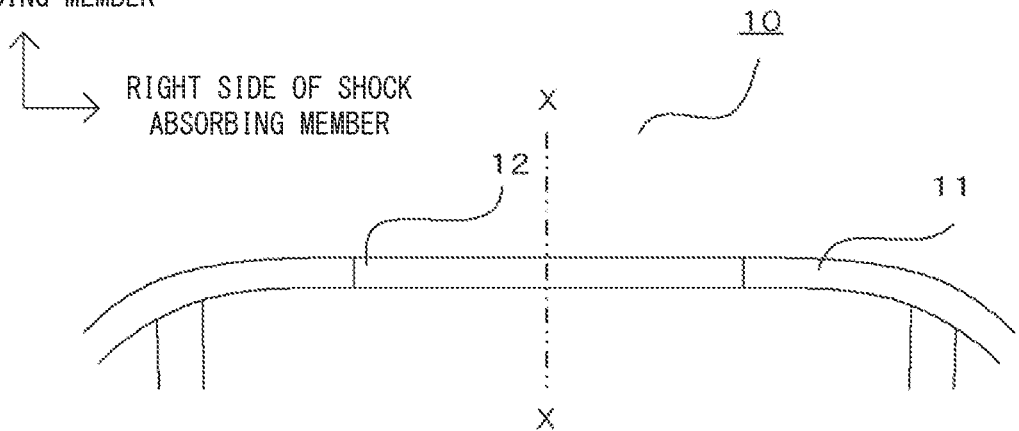
FIG. 5 is a top view of a bumper structure in another Comparative Example.
Figure 6:
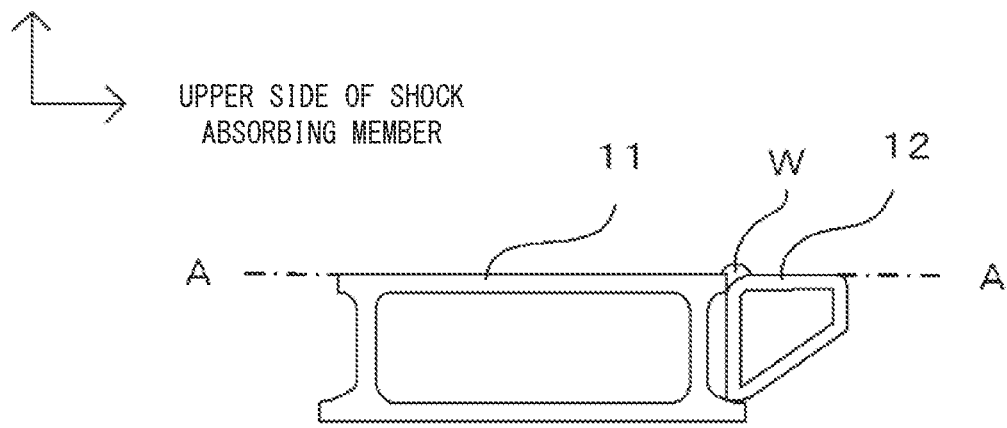
FIG. 6 is a cross-sectional view of the bumper structure taken along the line X-X in FIG. 5.

A result of full-wrap crash analysis performed on a model of Inventive Example of the present disclosure and models of Comparative Examples that the configurations of which fall outside the scope of the present disclosure will be described below. Note that, in all the following analysis, the shock absorbing member 10 is constructed as a bumper structure including the first hollow member 11 and the second hollow member 12 as a bumper reinforcement and a raised member, respectively. In order to exhibit advantageous effects of Inventive Example of the present disclosure, a bumper structure that does not include a raised component (Comparative Example 1, see FIGS. 3 and 4) and a bumper structure in which weld material and weld beads W project forward beyond the joined surface A-A (Comparative Example 2, see FIGS. 5 and 6) were prepared as Comparative Examples.

Regarding a material model in the FEM analysis, the bumper reinforcement was assumed to be formed of a 7000 series aluminum alloy extruded material the 0.2% proof stress of which is approximately 400 MPa. In addition, an energy absorbing member and the raised component were assumed to be formed of a 6000 series aluminum alloy extruded material the 0.2% proof stress of which is 180 MPa.

For the FEM analysis, general-purpose finite element analysis software RADIOSS (registered trademark) was used. Constraint conditions at the ends of the energy absorbing member were defined in such a way as to, assuming a case where a single plate is installed by welding, represent a mode in which displacements and rotations other than those in a crushing direction are constrained and the energy absorbing member is thrust by a rigid body.

Figure 7:
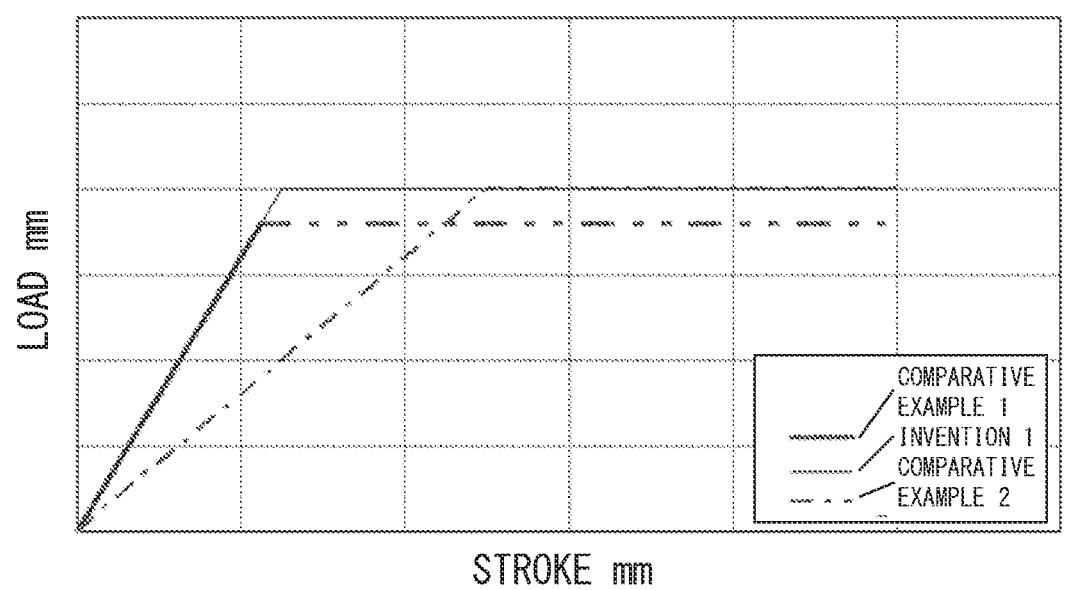
FIG. 7 is a graph of load-stroke curves illustrating results of full-wrap crash analysis in Examples.

Full-lap crash analyses were performed by use of the above-described software, and load-stroke curves were generated and are illustrated in FIG. 7.

As illustrated in FIG. 7, it is revealed that, in Inventive Example of the present disclosure, the load rises rapidly and reaches a high load in a short stroke. In other words, it is revealed that it becomes possible to absorb energy due to shock earlier because the load rises at an initial stage of a stroke and the shock absorbing member 10 of the present disclosure thus has excellent strength and excellent shock absorbency as a bumper structure.

On the other hand, in Comparative Example 1 in which no raised member is included, although the load actually rises rapidly and shows a similar tendency to the Inventive Example of the present disclosure, a maximum load is lower than that of the Inventive Example of the present disclosure. The reason for the result is considered to be that, in the Comparative Example 1, dispersion and absorption of energy due to shock is inferior to those in Inventive Example of the present disclosure because no raised member is included.

In Comparative Example 2 in which the weld material and weld beads W project forward beyond the joined surface A-A, although a maximum load is actually similar to that in Inventive Example of the present disclosure, the load rises more slowly.

In Comparative Example 2, weld material and the like project forward beyond the joined surface A-A. The reason for the above result is considered to be that, because of this structural feature, energy due to shock initially concentrates on the projections and is subsequently dispersed to and absorbed by the bumper reinforcement or the raised member.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-105078, filed on May 31, 2018, the entire disclosure of which is incorporated by reference herein.

INDUSTRIAL APPLICABILITY

A shock absorbing member according to the present disclosure is suitably used as a constituent member of a bumper for a vehicle, such as an automobile.

REFERENCE SIGNS LIST

10 Shock absorbing member
11 First hollow member
12 Second hollow member
16 Step
W Weld material and weld beads

The invention claimed is:

1. A shock absorbing member comprising:
a first hollow member; and
a second hollow member,
wherein
the first hollow member and the second hollow member are made of aluminum alloy and are joined to each other by a weld bead to form a joined surface that is used to receive shocks,
the second hollow member has a step adjacent to the first hollow member that is receded from the joined surface,
in a state before the joining of the first hollow member and the second hollow member, the step is open toward a front of the joined surface,
a surface of an edge of an upper surface of the first hollow member and a surface of an edge of an under surface of the second hollow member are joined are each other in the step, and
the weld bead does not project above the joined surface.

2. The shock absorbing member according to claim 1, wherein the second hollow member has a triangular cross-section, and the first hollow member and the second hollow member have surfaces flush with each other on a crash surface side.

3. The shock absorbing member according to claim 1, wherein at least one of the first hollow member or the second hollow member is formed of an extruded material.

4. The shock absorbing member according to claim 1, wherein the first hollow member is a bumper reinforcement, the second hollow member is a raised member, and the shock absorbing member constitutes a bumper structure.

5. The shock absorbing member according to claim 2, wherein at least one of the first hollow member or the second hollow member is formed of an extruded material.

6. The shock absorbing member according to claim 2, wherein the first hollow member is a bumper reinforcement, the second hollow member is a raised member, and the shock absorbing member constitutes a bumper structure.

* * * * *